(12) United States Patent
Wakebe

(10) Patent No.: US 10,807,249 B2
(45) Date of Patent: Oct. 20, 2020

(54) ROBOT

(71) Applicant: Fanuc Corporation, Yamanashi (JP)

(72) Inventor: Yoshihito Wakebe, Yamanashi (JP)

(73) Assignee: FANUC CORPORATION, Ymanashi (JP)

( * ) Notice: Subject to any disclaimer, the term of this patent is extended or adjusted under 35 U.S.C. 154(b) by 105 days.

(21) Appl. No.: 16/271,321

(22) Filed: Feb. 8, 2019

(65) Prior Publication Data

US 2019/0255710 A1  Aug. 22, 2019

(30) Foreign Application Priority Data

Feb. 22, 2018  (JP) .................................. 2018-029709

(51) Int. Cl.
  *B25J 13/08*  (2006.01)
  *B25J 15/00*  (2006.01)

(52) U.S. Cl.
  CPC .......... *B25J 15/0019* (2013.01); *B25J 13/085* (2013.01)

(58) Field of Classification Search
  CPC ...... B25J 13/082; B25J 13/084; B25J 13/085; B25J 15/0019; G05B 2219/40586
  See application file for complete search history.

(56) References Cited

U.S. PATENT DOCUMENTS

| 2014/0316572 A1 | 10/2014 | Iwatake |
| 2015/0343640 A1* | 12/2015 | Shi ...................... B25J 9/1697 382/153 |
| 2015/0352716 A1 | 12/2015 | Sonehara et al. |
| 2017/0028561 A1* | 2/2017 | Yamada ................. B25J 13/082 |
| 2018/0099421 A1* | 4/2018 | Ogata ................... B25J 17/0225 |
| 2018/0169854 A1* | 6/2018 | Shiratsuchi ............. B25J 9/042 |

FOREIGN PATENT DOCUMENTS

| GB | 2525355 A | 10/2015 |
| JP | 2001-038659 A | 2/2001 |
| JP | 2014-050936 A | 3/2014 |
| JP | 2014-210311 A | 11/2014 |
| JP | 5618770 B2 | 11/2014 |
| JP | 2016-002628 A | 1/2016 |
| JP | 6011089 B2 | 10/2016 |
| JP | 6136337 B2 | 5/2017 |
| WO | WO-2014129524 A1 | 8/2014 |
| WO | WO-2017037967 A1 | 3/2017 |

OTHER PUBLICATIONS

Ishikawa, Kaoru; Notice of Reasons for Refusal; Japanese Patent Application No. 2018-029709; dated Jan. 28, 2020; 4 pages.
Industrial Property Cooperation Center; Search Report by Registered Search Organization; Japanese Patent Application No. 2018-029709; dated Jan. 23, 2020; 6 pages.

* cited by examiner

*Primary Examiner* — Dale Moyer
(74) *Attorney, Agent, or Firm* — Shackelford, Bowen, McKinley & Norton, LLP

(57) ABSTRACT

A robot including an arm, a force sensor attached to a distal end portion of the arm, a support member attached to the force sensor, a tool supported by the support member, a plurality of protruding portions for detecting posture, which protrude from the support member, and a controller which determines a situation where all of the protruding portions are in contact with a work object on which the tool performs a predetermined work based on detected values of the force sensor.

5 Claims, 9 Drawing Sheets

ROBOT

CROSS-REFERENCE TO RELATED APPLICATIONS

This application is based on and claims priority to Japanese Patent Application No. 2018-029709 filed on Feb. 22, 2018, the entire content of which is incorporated herein by reference.

TECHNICAL FIELD

This invention relates to a robot.

BACKGROUND ART

Conventionally, when performing a work with a tool, such as a contact type measurement device and the like, by using a robot, there is a case where posture of the tool with regard to a work object cannot be controlled accurately. For example, the robot operates on the basis of an operation program which has been set beforehand, however, when the work objects have irregular shapes, the posture of the tool with regard to the work object, which is arranged on the basis of the operation program, is not accurate.

Also, a known robot system includes a cutting tool and a tool for measurement which are provided at a distal end portion of the robot. (See PLT 1, for example.) This robot system moves the distal end portion of the robot in a state where the tool for measurement is in contact with a surface of the work object so as to measure a shape of the surface of the work object. And, this robot system compares measured shape data of the surface with shape data of the surface, which is obtained by the robot system beforehand, so as to modify the operation program by using a difference therebetween.

CITATION LIST

Patent Literature

{PTL 1}
Japanese Patent Publication No. 6011089

SUMMARY OF INVENTION

A robot according to an aspect of the present invention includes an arm; a force sensor attached to a distal end portion of the arm; a tool or a support member for supporting the tool, which are attached to the force sensor; a plurality of protruding portions for detecting posture, which protrude from the tool or the support member; and a controller which determines a situation where all of the protruding portions are in contact with a work object on which the tool performs predetermined work based on detected values of the force sensor.

DESCRIPTION OF EMBODIMENTS

A robot 1 according to an embodiment of the present invention will be described below with reference to the accompanying drawings.

Figure 1:
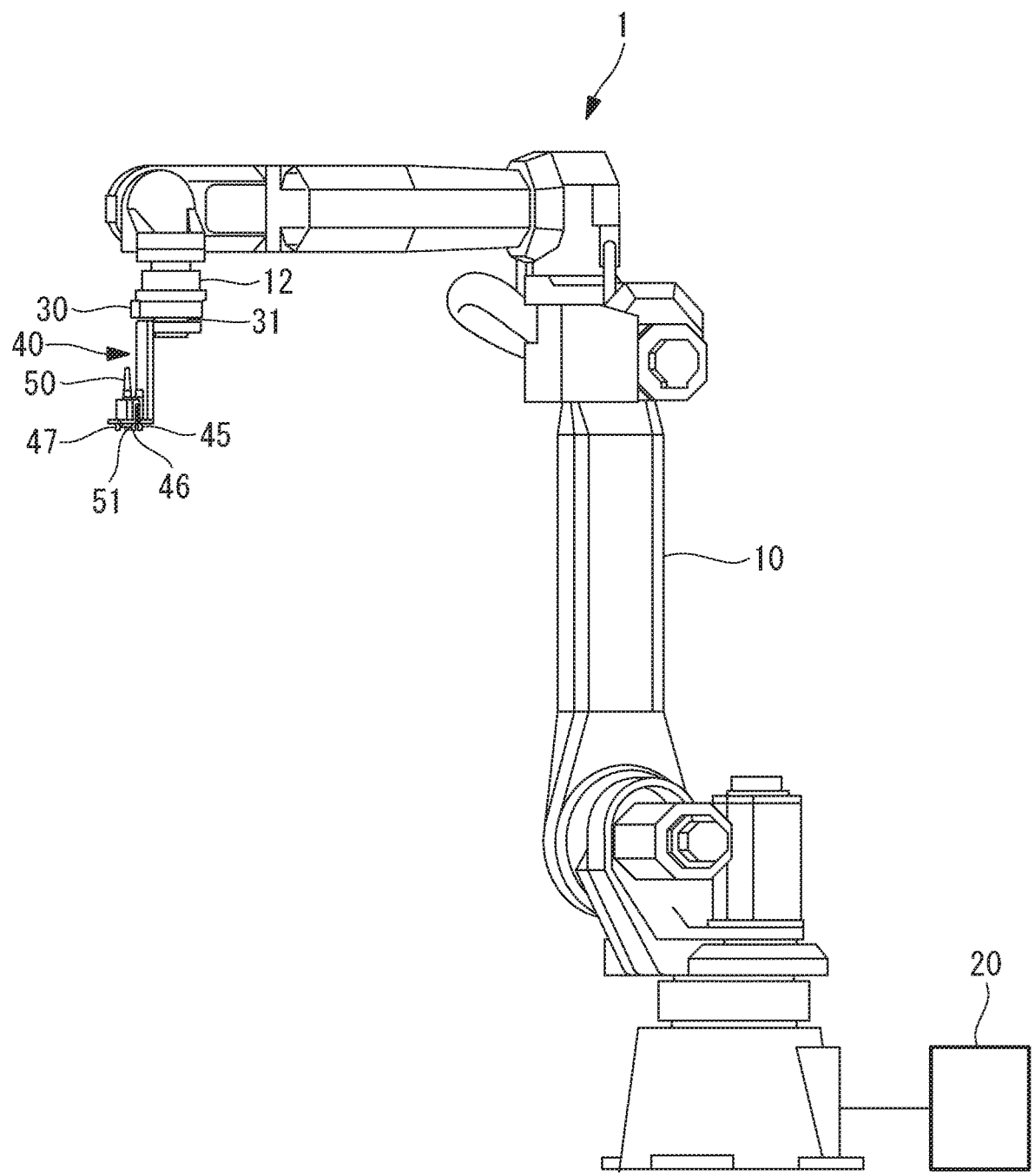
FIG. 1 is a diagram showing a schematic structure of a robot according to a first embodiment of the present invention.

As shown in FIG. 1, the robot 1 according to this embodiment includes an arm 10, a control unit 20, a force sensor 30 which is attached to a distal end portion of the arm 10, a support member 40 which is attached to the force sensor 30, and a tool 50 which is attached to the support member 40.

In this embodiment, the tool 50 is a contact type measurement tool, however, the tool 50 may be a non-contact type measurement tool, other kinds of tools, and the like. The contact type measurement tool refers to a thickness meter, an internal inspection device using ultrasonic waves, a hardness measurement device, and the like. The non-contact type measurement tool refers to a non-contact type thermometer, a close-up camera, and the like. Examples of the other kinds of tools are a processing tool, a tool for assembly, and the like. Examples of the processing tool are a drilling tool such as an electric drill and the like, a screw forming tool having a tap at its distal end, an electric polishing tool, a paint tool such as a paint gun and the like, a welding tool such as a servo gun and the like, and so forth. Examples of the tool for assembly include an electric screwdriver, a tool which holds a pin and inserts it into a hole, and the like.

The arm 10 has a plurality of arm members and joints. Also, the arm 10 includes a plurality of servo motors 11 for respectively driving the plurality of joints (refer to FIG. 5). As the servomotors 11, every kind of servomotor such as a rotary motor, a linear motor, and the like can be used. Each of the servo motors 11 has an operation position detection device, which is for detecting an operation position and operation speed of the servo motor 11, and one example of the operation position detection device is an encoder. Detected values of the operation position detection devices are transmitted to the control unit 20.

Figure 3:
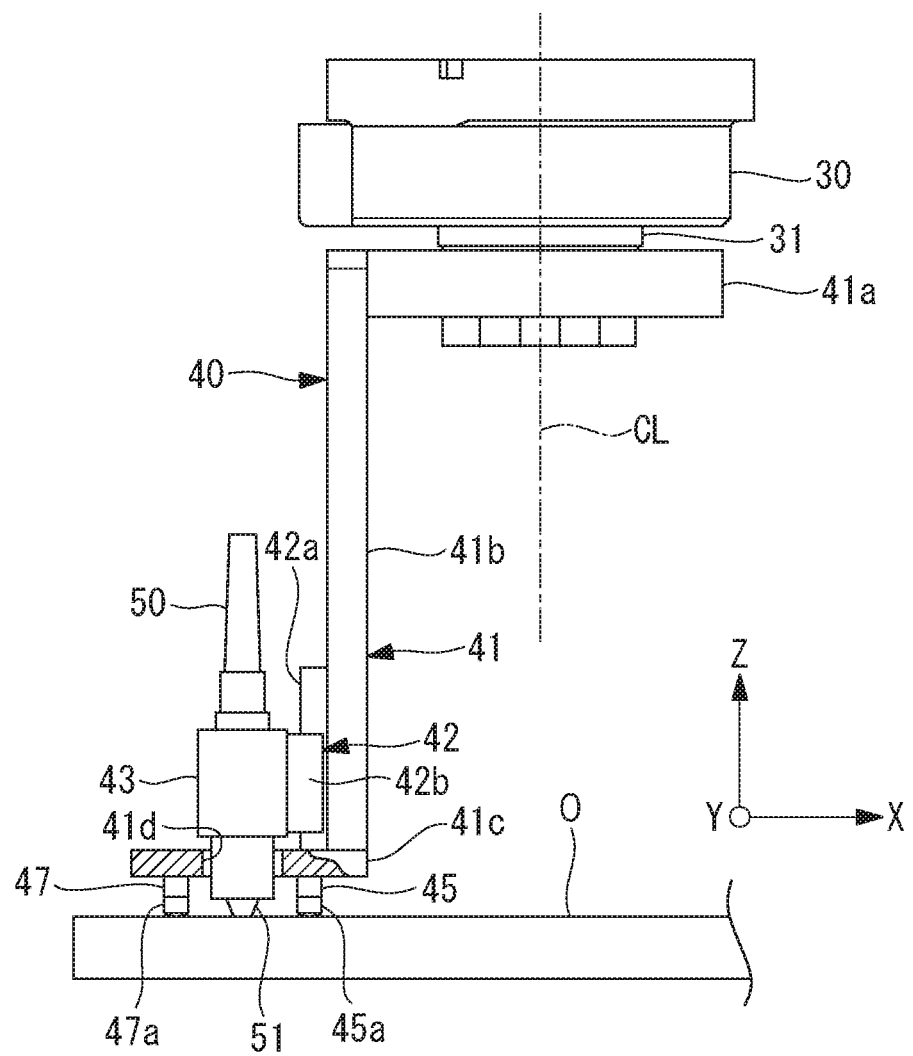
FIG. 3 is an approximately front view of the distal end portion of the robot and a tool of this embodiment.

The force sensor 30 is a known six-axis sensor. As shown in FIG. 1, the force sensor 30 is fixed to a wrist flange 12 of the arm 10. Also, as shown in FIG. 3, a direction to which a Z-axis of the force sensor extends is parallel to a direction to which a central axis line CL of the wrist flange 12 of the arm 10 extends. In this embodiment, a central axis line of the force sensor 30 corresponds to the central axis line CL of the wrist flange 12 of the arm 10. In the following description, an X-axis direction, a Y-axis direction, and a Z-axis direction of the force sensor 30, which are shown in FIG. 3, may simply be referred to as an X-axis direction, a Y-axis direction, and a Z-axis direction.

The force sensor 30 detects force in the Z-axis direction, force in the X-axis direction, and force in the Y-axis direction which are applied to a flange 31 of the force sensor 30. The flange 31 is also a member-fixed portion to which a member is attached. In addition, the force sensor 30 also detects torque about the Z-axis, torque about the X-axis, and torque about the Y-axis which are applied to the flange 31.

The support member 40 is a member for supporting the tool 50. The support member 40 has a support member body 41, a linear guide 42 which is fixed to the support member body 41, and a tool holder 43 which is supported by the linear guide 42.

The support member body 41 has an attachment portion 41a which is fixed to the flange 31 of the force sensor 30 by means of a bolt and the like, which are not shown in the figures, a middle portion 41b which is supported by the attachment portion 41a, and a distal end portion 41c which is supported by the middle portion 41b.

In this embodiment, one end of the middle portion 41b in the Z-axis direction is fixed to the attachment portion 41a, and the other end of the middle portion 41b in the Z-axis direction is fixed to the distal end portion 41c.

The distal end portion 41c is, for example, a plate-like member. A through-hole 41d is provided at the distal end portion 41c, and the through-hole 41d penetrates the distal end portion 41c along the Z-axis direction.

A rail 42a of the linear guide 42 is fixed to the middle portion 41b, and a longitudinal direction of the rail 42a is parallel to the Z-axis. A slider 42b is attached to the rail 42a, and the slider 42b is movable along the rail 42a in the Z-axis direction.

The tool holder 43 is fixed to the slider 42b, and the tool 50 is supported by the tool holder 43. Therefore, the tool 50 and the tool holder 43 are movable along the rail 42a in the Z-axis direction. One end portion of the tool 50 in the Z-axis direction, which is supported by the tool holder 43, is inserted into the through-hole 41d. Here, a probe 51 is provided at the one end portion of the tool 50 in the Z-axis direction. Also, in this embodiment, distance between the one end of the tool 50 in the Z-axis direction and the force sensor 30 is more distant than that between the other end of the tool 50 in the Z-axis direction and the force sensor 30. Also, the probe 51 is provided at the one end of the tool 50.

That is to say, the tool 50 is movable with regard to the distal end portion 41c in the Z-axis direction. And, the one end portion of the tool 50, at which the probe 51 is provided, protrudes from one surface of the distal end portion 41c in a thickness direction, and distance between the one surface in the thickness direction and the force sensor 30 is more distant than that between the other surface in the thickness direction and the force sensor 30. That is to say, the one end portion of the tool 50 protrudes with regard to the distal end portion 41c toward a direction which is distant from the force sensor 30.

Figure 2:
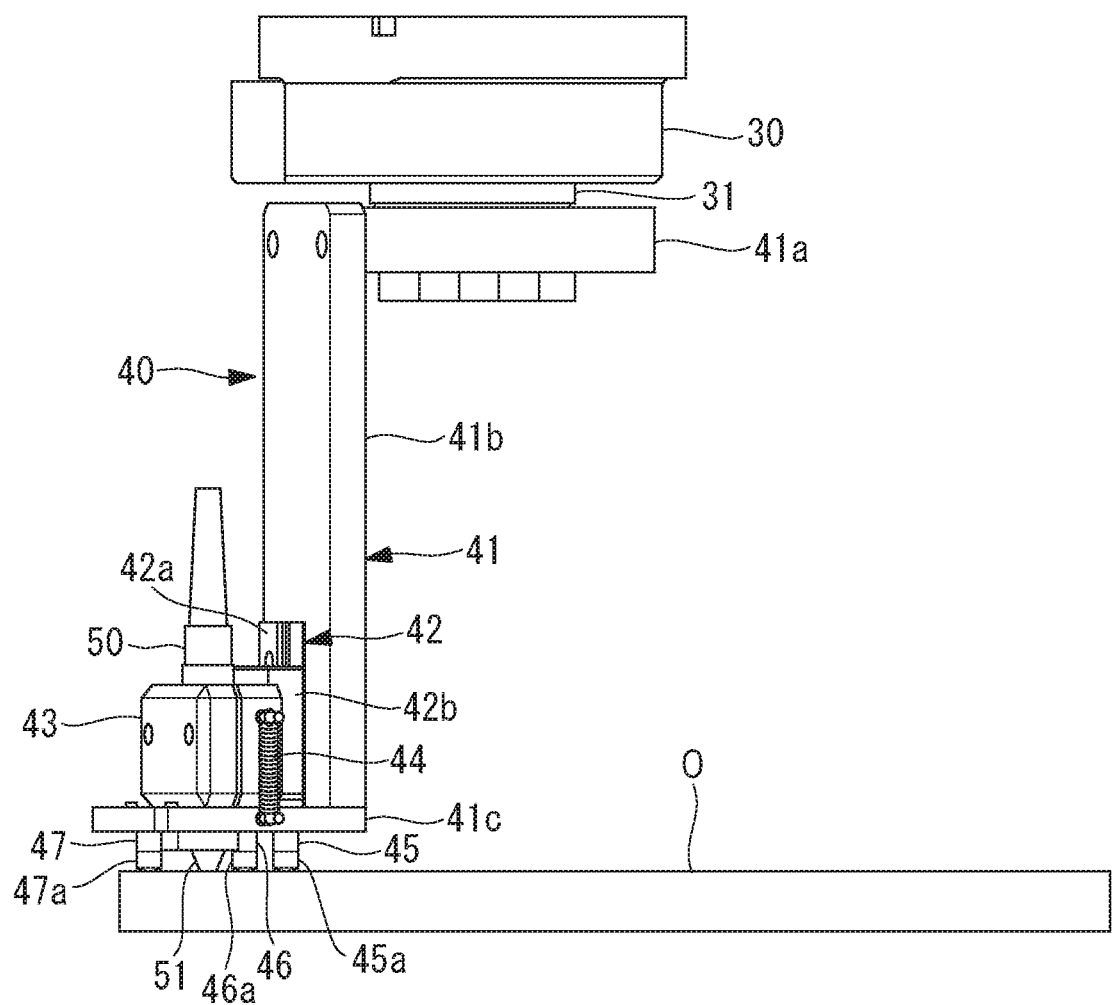
FIG. 2 is a schematic view of a distal end portion of an arm of the robot of this embodiment.

Moreover, the support member 40 has a biasing member 44 such as a spring and the like (refer to FIG. 2). One end of the biasing member 44 is fixed to the tool holder 43, and the other end of the biasing member 44 is fixed to the distal end portion 41c. The tool holder 43 is energized by the biasing member 44, and its biasing direction is a direction toward a distant side from the force sensor 30.

A plurality of protruding portions 45, 46, 47 are provided in the distal end portion 41c (refer to FIG. 2). Each of the protruding portions 45, 46, 47 is a protruding portion for detecting posture. In this embodiment, the three protruding portions 45, 46, 47 are provided in the distal end portion 41c. And each of the protruding portions 54, 46, 47 protrudes from one surface of the distal end portion 41c toward a direction which is distant from the force sensor 30. That is to say, each of the protruding portions 45, 46, 47 protrudes with regard to the one surface of the distal end portion 41c toward the Z-axis direction.

Distal end portions 45a, 46a, 47a of the protruding portions 45, 46, 47 are made of plastic material (refer to FIG. 2). As shown in FIG. 3, when all of the distal ends of the protruding portions 45, 46, 47 come in contact with a surface of a work object O, posture of the tool 50 becomes posture which is suitable for preforming a predetermined operation with regard to the work object O. As one example, the surface of the work object O is a plane surface, a curved surface having a substantially uniform curvature, a curved surface having a relatively large curvature, a surface with unevenness which is smaller than a protruded amount of the protrusion portion 45, and the like.

The positions of the plurality of the protruding portions 45, 46, 47 are distant from each other in a direction that is orthogonal to the Z-axis. The distance, which is between the distal ends of the protruding portions 45, 46, 47 with each other in the direction orthogonal to the Z-axis, is preferably more than 1 cm, and it is more preferable that the distance thereof is more than 2 cm.

In this embodiment, the two protruding portions 45, 46 are aligned in the Y-axis direction, and the other protruding portion 47 is placed at a position which is distant with regard to the protruding portions 45, 46 from the X direction.

In this embodiment, the tool 50 is the contact type measurement tool. Thus, in the Z-axis direction, distance between positions of the one end of the tool 50 and the force sensor 30 is more distant than that between positions of the distal ends of the protruding portions 45, 46, 47 and the force sensor 30. And, as shown in FIG. 3, when all of the distal ends of the protruding portions 45, 46, 47 come in contact with the surface of the work object O, the tool 50 moves, opposing the biasing force of the biasing member 44 so as to move toward the Z-axis direction.

Figure 4:
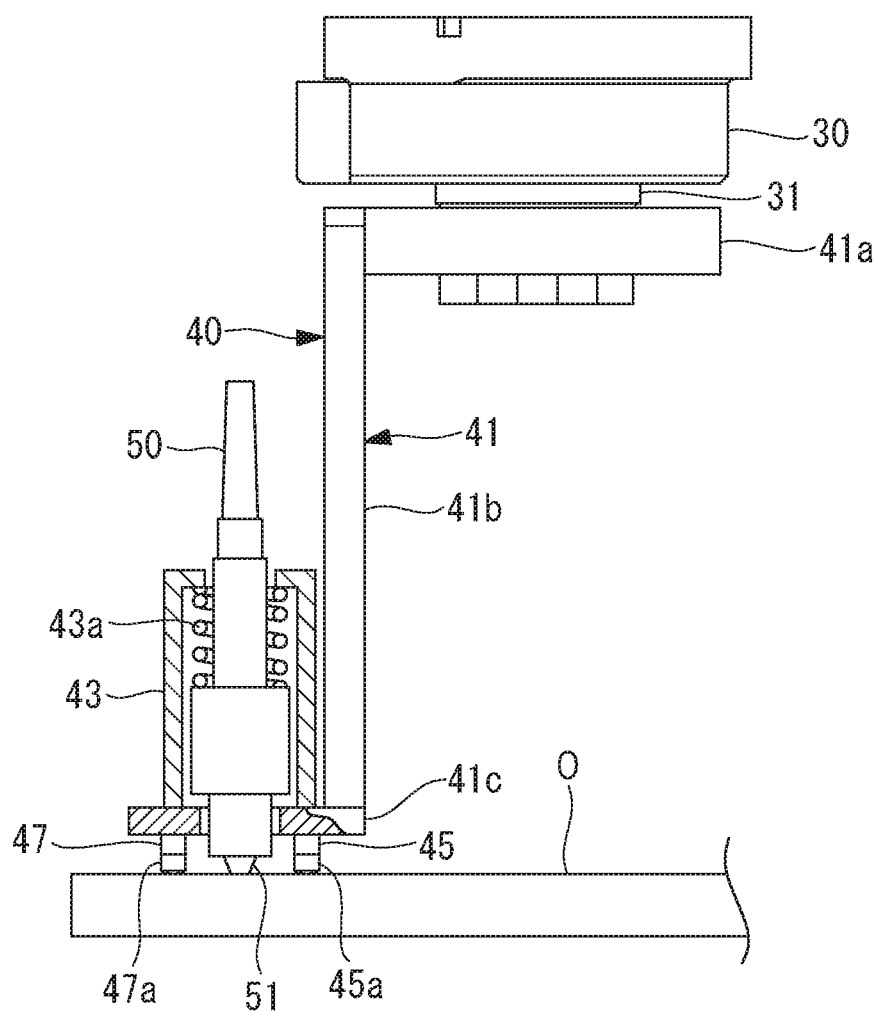
FIG. 4 is an approximately front view showing a modified example of a support member of the tool of this embodiment.

Also, as shown in FIG. 4, the tool holder 43 may be fixed to the middle portion 41b or the distal end portion 41c, and the tool 50 may be able to move, opposing the biasing force of the biasing member 44, such as the spring and the like, in the Z-axis direction. In this case also, when all of the distal ends of the protruding portions 45, 46, 47 come in contact with the surface of the work object O, the posture of the tool 50 is the posture which is suitable for performing the predetermined operation to the work object O.

Figure 5:
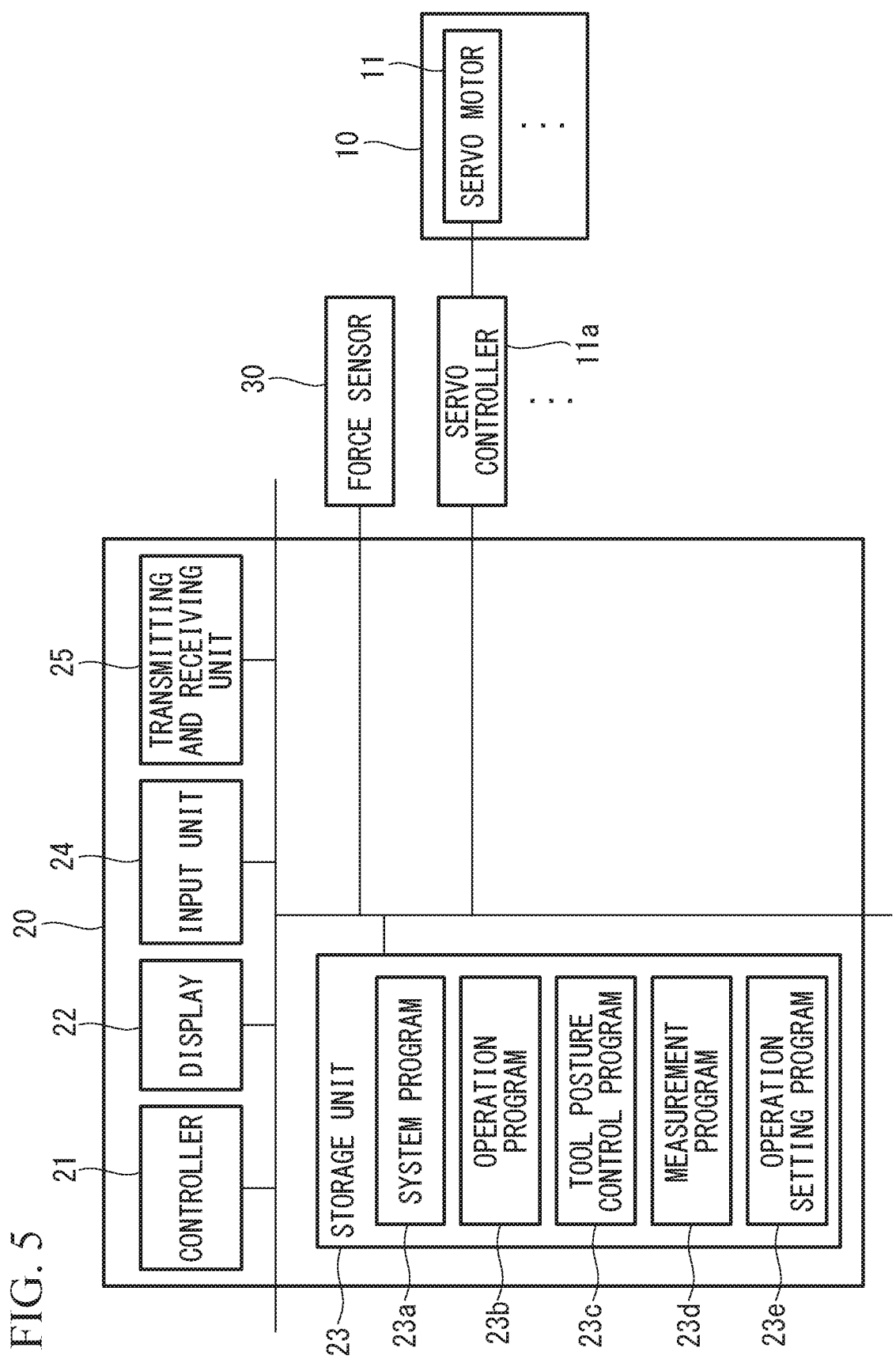
FIG. 5 is a block diagram of a control unit of the robot of this embodiment.

As shown in FIG. 5, the control unit 20 has a controller 21 having a processor and the like, a display 22, a storage unit 23 having a non-volatile storage, a ROM, a RAM, and the like, an input device 24 having a key board, a touch panel, a teach pendant, and the like, and a transmitting and receiving unit 25 for transmitting and receiving signals. The input device 24 and the transmitting and receiving unit 25 function as an input unit. The control unit 20 is connected to the force sensor 30 and servo controllers 11a of the servo motors 11.

In this embodiment, the control unit 20 is a robot control unit which controls movements of the robot 1. Whereas, the control unit 20 may be a control unit which is provided inside the robot control unit or outside the robot control unit, and which has the above described configuration.

A system program 23a is stored in the storage unit 23, and the system program 23a provides a basic function of the control unit 20. Also, an operation program 23b is stored in the storage unit 23. And, a tool posture control program 23c, a measurement program 23d, and an operation setting program 23e, which sets and resets the operation program 23b, are stored in the storage unit 23. The operation program 23b is a series of control commands which control the robot 1 at the time of performing a predetermined work by using the tool 50.

In this embodiment, the controller 21 sends control commands to the servo controllers 11a of the servo motors 11 on the basis of the operation program 23b. By this, in order to perform the predetermined work, the robot 1 changes a position and posture of the tool 50 in accordance with the operation program 23b.

In this embodiment, film thickness at the surface of the work object O is measured at a plurality of measurement positions by the tool 50. It also can be said that the measurement position is a work position at which the tool 50 performs the operation. Also, in this embodiment, a size of the work objects O is large, and therefore, it is not possible to ignore irregularity in shape of the work objects O. For that reason, there is a case that the tool 50 is not in suitable posture with regard to the surface of the work objects O when the tool 50 is placed at each of the measurement positions so that the position and the posture of the tool 50 to be the position and the posture which have been set by the operation program 23b.

Such circumstance also occurs when the setting of the operation program 23b is not precisely performed. It takes much time to perform the precise setting of the operation program 23b. For example, it requires much time to set the operation program 23b in which the posture of the tool 50 at each of the measurement positions has been adjusted accurately. Conversely speaking, the below described process is useful when a degree of the irregularity in shape of the work objects O is large, and it is also useful for performing the setting of the operation program 23b in a short period of time. Moreover, when the work position is marked on the surface of the work objects O so as to place the tool 50 at the work position by using a vision system, the posture of the tool 50 can also be adjusted accurately by using the below described process.

Figure 6:
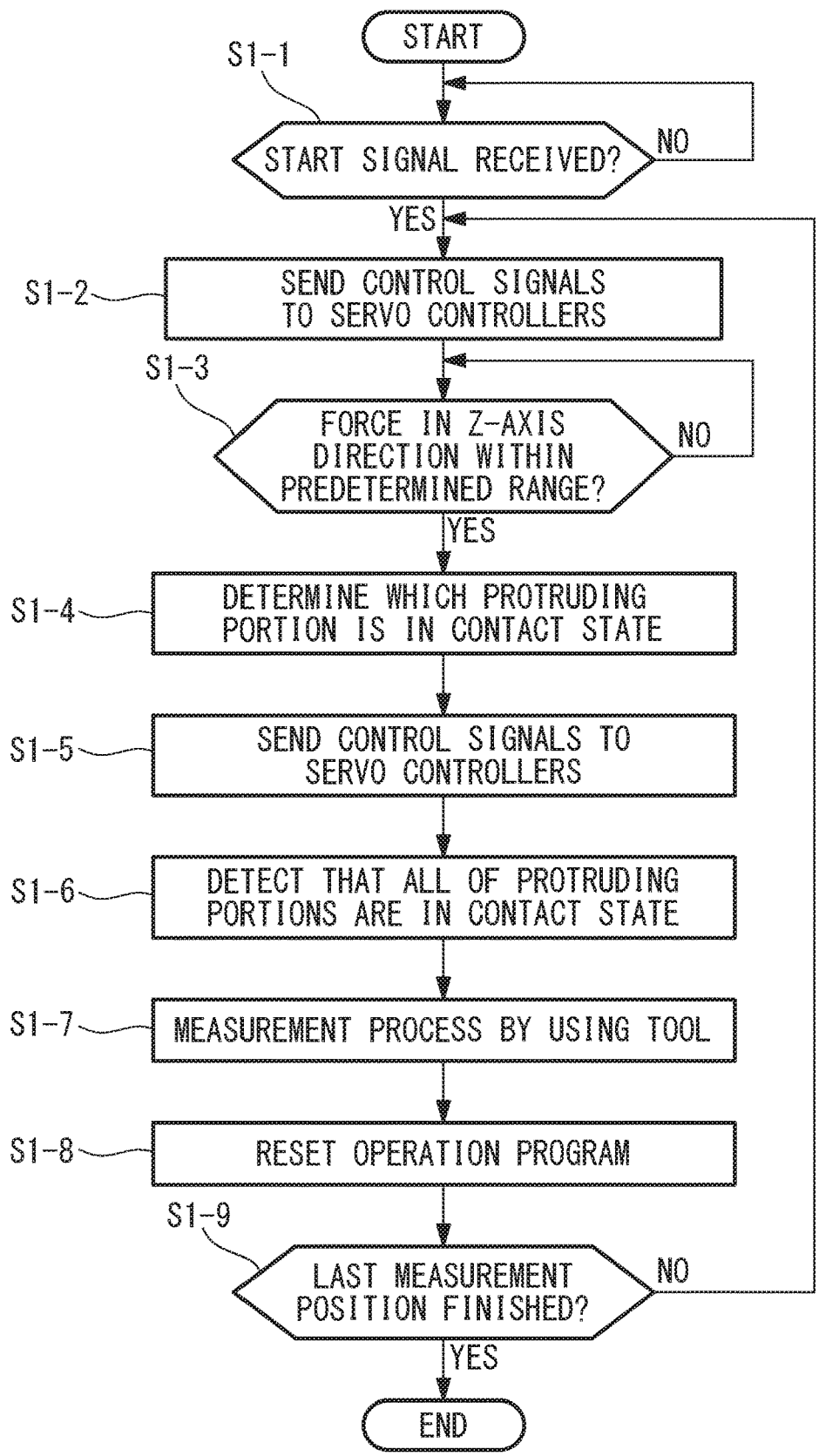
FIG. 6 is a flow chart showing process of the control unit of this embodiment.

In such circumstance, the controller 21 performs the below described process on the basis of the operation program 23b, the tool posture control program 23c, the measurement program 23d, and the operation setting program 23e. The below described process is shown in a flowchart of FIG. 6.

Firstly, when the controller 21 receives a start signal which is input by using the input device 24, the transmitting and receiving unit 25, and the like (Step S1-1), the controller 21 sends control commands, which are on the basis of the operation program 23b, to the servo controllers 11a (Step S1-2). By this, the arm 10 operates on the basis of the operation program 23b, and the tool 50 is placed at a predetermined measurement position due to the operation of the arm 10.

Figure 7:
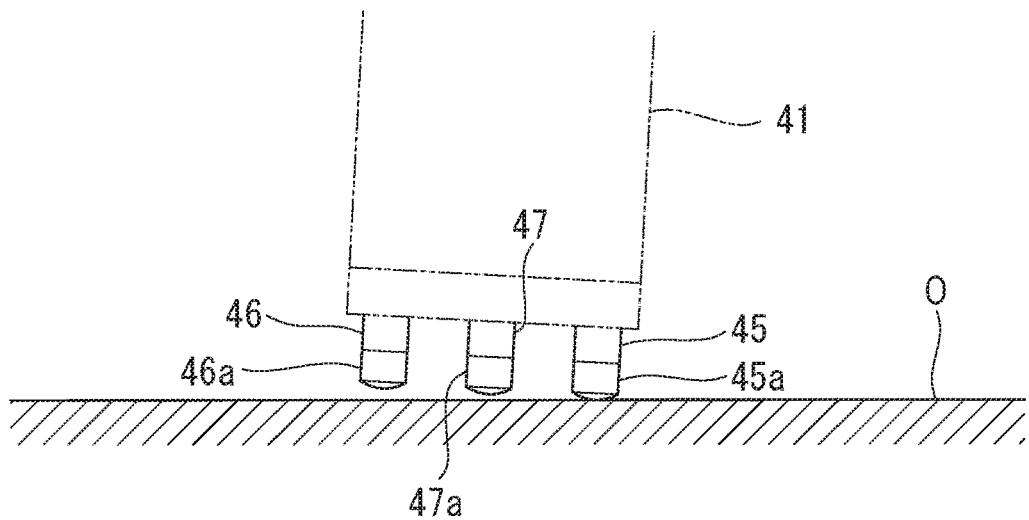
FIG. 7 is a diagram showing a contact state of the protruding portions of this embodiment.

At this time, on the basis of the tool posture control program 23c, the controller 21 moves the distal end portion of the arm 10 in the Z-axis direction so that detected values of force in the Z-axis direction, which are detected by the force sensor 30, become within a predetermined range (Step S1-3). At this time, as shown in FIG. 7, for example, only the protruding portion 45 comes in contact with the work object O, and the protruding portion 46 and the protruding portion 47 do not come in contact with the work object O.

Here, position coordinates of the force sensor 30 in a coordinate system of the robot 1 are stored in the storage unit 23, and position coordinates of each of the distal ends of the protruding portions 45, 46, 47 in the coordinate system of the robot 1 are also stored in the storage unit 23. The controller 21 determines which protruding portion comes in contact with the work object O among the plurality of the protruding portions 45, 46, 47 by using the force in the Z-axis direction, the torque around the Y-axis, the tuque around the X-axis, and the like, which are detected by the force sensor 30, on the basis of the tool posture control program 23c (Step S1-4).

Subsequently, on the basis of the tool posture control program 23c, the controller 21 sends control commands, which are for changing the posture of the tool 50 and the support member 40 with regard to the work object O, to the servo controllers 11a so that the protruding portions 46, 47, which have not come in contact with the work object O, come in contact with the work object O (Step S1-5). In this embodiment, the controller 21 sends control commands, which are to incline the tool 50 in the X-direction and/or the Y-direction, to the servo controllers 11a.

When the protruding portions 46, 47, which have not come in contact with the work object O, come in contact with the work object O by inclining the tool 50, a singularity occurs in changes in the force in the Z-axis direction, the torque about the Y-axis, the torque about the X-axis, and the like which are detected by the force sensor 30. The singularity is, for example, a point where a rate of change of the torque, which changes in response to the inclination of the tool 50, changes. The controller 21 detects a situation where all of the protruding portions 45, 46, 47 have come in contact with the work object O by using the singularity on the basis of the tool posture control program 23c (Step S1-6). Also, the controller 21 may detect a situation where all of the protruding portions 45, 46, 47 have come in contact with the work object O by using the position coordinates of the distal end of each of the protruding portions 45, 46, 47, and the force in the Z-axis direction, the torque about the X-axis, the torque about the X-axis, and the like, which are detected by the force sensor 30.

When it is detected that all of the protruding portions 45, 46, 47 have come in contact with the work object O, the controller 21 performs measurement process by using the tool 50 on the basis of the measurement program 23d (Step S1-7). The measurement process includes saving measured values, which are measured by the tool 50, to the storage unit 23, sending thereof to a predetermined device, displaying thereof by using the display 22, and the like.

Subsequently, on the basis of the operation setting program 23e, the controller 21 resets a part of the operation program 23b, which relates to the predetermined measurement position, by using detected values of the operation position detection device of each of the servo motors 11 at a time when the measurement process of Step S1-7 is performed (Step S1-8).

The controller 21 performs Step S1-2 to Step S1-8 repeatedly in order to perform the measurement at the other measurement positions until the measurement of the last measurement position is completed (Step S1-9).

Also, it is not necessary to perform Step S1-8 in such a case where the degree of the irregularity in shape of the work objects O is large. And, it is not necessary to perform Step S1-3 in such a case where any of the protruding portions 45, 46, 47 comes in contact with the work object O in Step S1-2. Moreover, it is not necessary to perform Step S1-4 in such a case where the determination, which is made in Step S1-6, can be made just by performing Step S1-5.

As described above, in this embodiment, the controller 21 determines a situation where all of the protruding portions 45, 46, 47 have come in contact with the work object O on the basis of the detected values of the force sensor 30. Whereas, the fact that all of the protruding portions 45, 46, 47 come in contact with the work object O means that the tool 50 is in predetermined posture with regard to the work object O. Accordingly, the above configuration is useful for accurately controlling the posture of the tool 50 with regard to the work object O.

In addition, since the plurality of the protruding portions 45, 46, 47 are used, it is possible to determine that the tool 50 is in the predetermined posture with regard to the work object O not only when the surface of the work object O is a plane surface, but also when the surface thereof is a curved surface, a surface with unevenness, and the like.

Also, in this embodiment, the controller 21 determines a situation where all of the protruding portions 45, 46, 47 have come in contact with the work object O by using the singularity which occurs in the change in the detected values of the force sensor 30 in a state where the posture of the tool 50 or the support member 40 is changing. Since the singularity which occurs in the change in the detected values of the force sensor 30 is used, it is possible to perform the adjustment of the posture of the tool 50 accurately by using a simple structure.

And, in this embodiment, the tool 50 is the contact type measurement tool which performs predetermined measurement in a state where the tool 50 is coming in contact with the work object O. With this kind of the measurement tool, it is often the case that the measurement values vary in response to the posture of the tool with regard to the work object O. Therefore, the above described configuration, which is capable of accurately adjusting the posture of the tool 50, improves accuracy of the measurement which is performed by using the tool 50.

Figure 8:
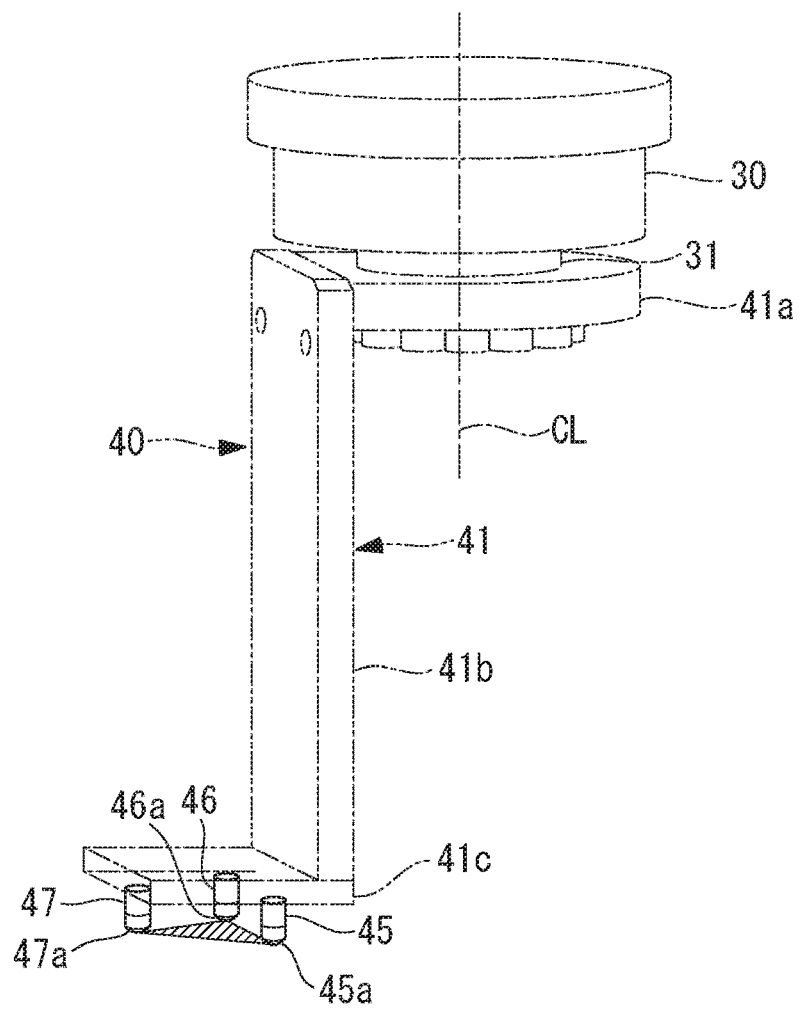
FIG. 8 is a diagram showing a positional relationship between the protruding portions and a central axis line of this embodiment.

Further, in this embodiment, as shown in FIG. 8, the central axis line CL of the wrist flange 12 of the robot 1 does not pass through the triangle which is formed by connecting the distal ends of the three protruding portions 45, 46, 47. The triangle is shown the hatching lines in FIG. 8. By using this configuration, the singularity in a change in the torque, which is detected by the force sensor 30, can appear significantly.

Also, even in a case where the central axis line CL passes through the triangle, which is formed by connecting the distal ends of the three protruding portions 45, 46, 47, an effect which is the same as or similar to those described above can be obtained.

Moreover, in this embodiment, it is also possible to omit the protruding portion 47, and use the one end portion of the tool 50 instead of the protruding portion 47. In this case, the tool 50 is fixed to the support member 40, for example, and the tool 50 does not move with regard to the support member 40 in the Z-axis direction. Even with this configuration, in Step S1-6, it is possible to detect that the protruding portions 45, 46 and the one end portion of the tool 50 come in contact with the work object O by using the singularity occurred in the change in the detected values of the force sensor 30. And in Step S1-7, it is possible to perform the measurement process by means of the tool 50 when the contact is detected. In this case also, it is possible to adjust the posture of the tool 50 with regard to the work object O accurately.

A robot 1 according to a second embodiment of the present invention will be described below with reference to the accompanying drawings.

In the second embodiment, components identical to those in the previous embodiment are provided with the same reference numerals, and description of the configurations and processes, which are identical to or similar to those in the previous embodiment, are omitted. Also, it is possible to apply to the second embodiment a modification, which is similar to the case in the previous embodiment. For example, the tool 50 can be replaced by the other kinds of tools, such as an electric driver and the like, the control unit 20 can be provided outside the robot controller, and the like.

In the second embodiment, the tool 50 is not supported by the support member 40, and the controller 21 performs a process for setting or resetting the operation program 23b. Also, the controller 21 may set and reset the operation program 23b in a state where the tool 50 is supported by the support member 40. And, in the second embodiment, a provisional operation program, which places the tool 50 at the work position, is stored in the storage unit 23. Note that the above described process is useful especially when the degree of the irregularity in shape of the work objects O is small.

Figure 9:
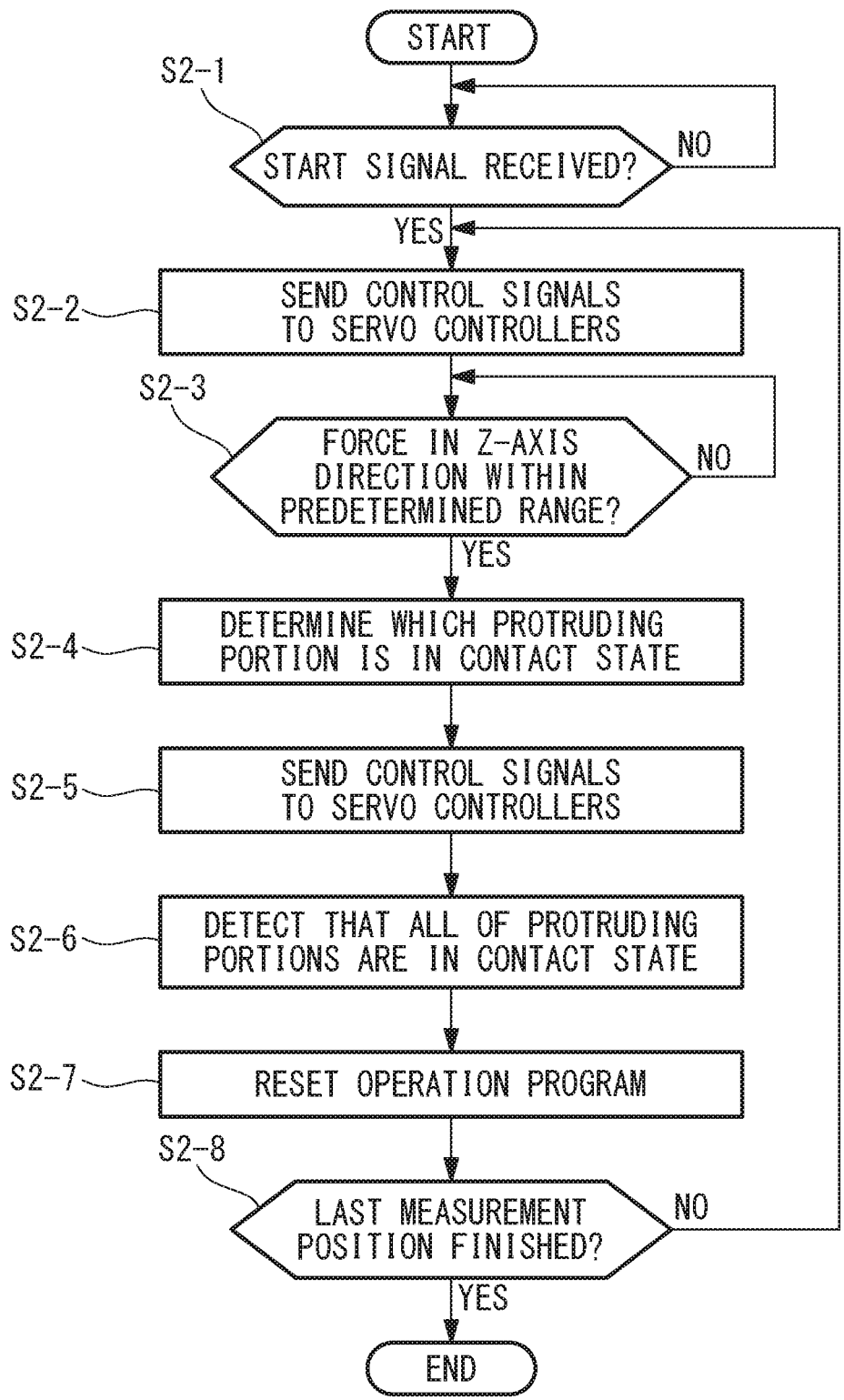
FIG. 9 is a flowchart showing process of a control unit of a robot according to a second embodiment of the present invention.

The controller 21 performs the below described process on the basis of the provisional operation program, the tool posture control program 23c, and the operation setting program 23e. The below described process is shown in a flowchart of FIG. 9.

Firstly, when the controller 21 receives the start signal which is input by using the input device 24, the transmitting and receiving unit 25, and the like (Step S2-1), the controller 21 sends control commands, which are on the based of the provisional operation program, to the servo controllers 11a (Step S2-2). By this, the arm 10 operates on the basis of the provisional operation program, and the support member 40, which is for supporting the tool 50, is positioned at a predetermined work position due to the operation of the arm 10. Also, in Step S2-2, an operator may manually place the support member 40 at the predetermined work position by using a manual teaching mode. And, the operator may also place the support member 40 at the predetermined work position by using the input device 24.

When Step S2-2 is performed, on the basis of the tool posture control program 23c, the controller 21 moves the distal end portion of the arm 10 in the Z-axis direction so that the detected values of the force in the Z-axis direction, which are detected by the force sensor 30, to be within a predetermined range (Step S2-3). At this time, similar to the case in the first embodiment, for example, only the protruding portion 45 comes in contact with the work object O, and the protruding portion 46 and the protruding portion 47 do not come in contact with the work object O.

Next, the controller 21 determines which protruding portion comes in contact with the work object O among the plurality of the protruding portions 45, 46, 47 by using the force in the Z-axis direction, the torque about the Y-axis, the torque about the X-axis, and the like, which are detected by the force sensor 30, on the basis of the tool posture control program 23c (Step S2-4).

Subsequently, on the basis of the tool posture control program 23c, the controller 21 sends control commands, which change the posture of the support member 40 with regard to the work object O, to the servo motors 11a so that the protruding portions 46, 47, which have not come in contact with the work object O, come in contact with the work object O (Step S2-5).

When the protruding portions 46, 47, which have not come in contact with the work object O, come in contact with the work object O by inclining the support member 40, the singularity occurs in the changes in the force in the Z-axis direction, the torque about the Y-axis, the torque about the X-axis, and the like which are detected by the detected values of the force sensor 30. The controller 21 detects a situation where all of the protruding portions 45, 46, 47 have come in contact with the work object O by using the singularity on the basis of the tool posture control program 23c (Step S2-6).

When it is detected that all of the protruding portions 45, 46, 47 have come in contact with the work object O, on the basis of the operation setting program 23e, the controller 21 sets the part of the predetermined operation program 23b, which is relating to the predetermined work position, by using the detected values of the work position detection device of each of the servo motors 11 at a time when the detection in Step S2-6 is performed (Step S2-7).

The controller 21 performs Step S2-2 to S2-7 repeatedly in order to perform settings of the other work positions until the setting of the last work position is completed (Step S2-8). By this, the operation program 23b is set by using the provisional operation program. Also, when the operation program 23b is used instead of the provisional operation program in the above described process, the operation program 23b is reset by the above described process.

And, it is not necessary to perform Step S2-3 in such a case where any of the protruding portions 45, 46, 47 comes in contact with the work object O in Step S2-2. Moreover, it is not necessary to perform Step S2-4 in such a case where the determination, which is made in Step S2-6, can be made just by performing Step S2-5.

Like this, in this embodiment, the controller 21 determines a situation where all of the protruding portions 45, 46, 47 have come in contact with the work object O on the basis of the detected values of the force sensor 30. Whereas, the fact that all of the plurality of the protruding portions 45, 46, 47 come in contact with the work object O means that the tool 50 is in the predetermined posture with regard to the work object O. Accordingly, the above configuration is useful for accurately controlling the posture of the tool 50 with regard to the work object O.

Moreover, in the first and the second embodiments, the protruding portions 45, 46, 47 protrude with regard to the support member 40 in the Z-axis direction, however, the protruding portions 45, 46, 47 may protrude with regard to the support member 40 in the X-axis direction or the Y-axis direction. In this case, the one end portion of the tool 50 also protrudes from the support member 40 in the X-axis direction or the Y-axis direction.

Moreover, in the first and the second embodiments, the tool 50 itself may be fixed to the flange 31 of the force sensor 30. In this case, it is not necessary to provide the support member 40. And it is also possible to attach the distal end portion 41c to the tool 50 in a manner shown in FIG. 4, and to provide protruding portions 45, 46, 47, which are similar to those in the first and second embodiments, at the distal end portion 41c. In this case also, the same effect as described above can be obtained.

Further, in the first and the second embodiments, the force sensor 30 is the six-axis sensor, however, the force sensor 30 can be any sensor, as long as the sensor can detect which protruding portion comes in contact with the work object O among the protruding portions 45, 46, 47, as is the case with Step S1-6 and Step S2-6.

And, in the first and the second embodiments, each of the protruding portions 45, 46, 47 may be attached to the distal end portion 41c via the biasing member such as a spring, and the like. In this case also, the same effect as described above can be achieved.

Also, in the first and the second embodiments, the three protruding portions 45, 46, 47 are provided, however, it is possible to detect the singularity, which is described in Step S1-6 and Step S2-6, by using the two protruding portions 45, 46 only. That is to say, in the first and the second embodiments, in such a case where the inclination of the tool 50 about the Y-axis does not become a problem, and when the singularity, which is described in Step S1-6 and Step S2-6, is detected by using the protruding portions 45, 46, the posture of the tool 50 about the X-axis is adjusted.

Figure 10:
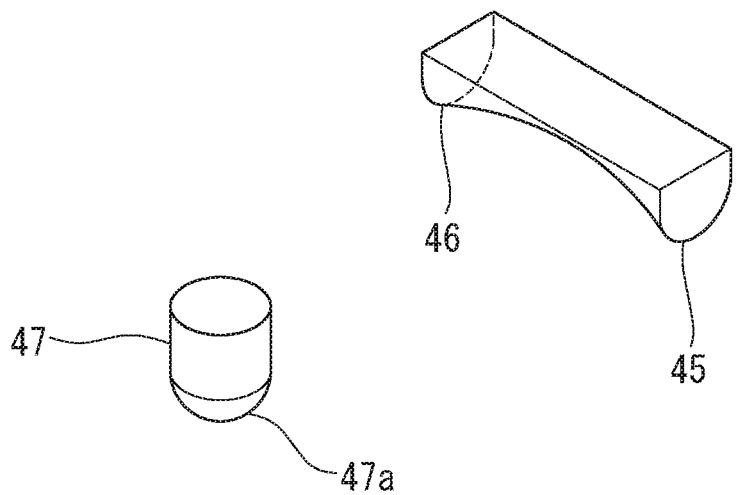
FIG. 10 is a perspective view showing a modified example of the protruding portions of the first and the second embodiments.

In addition, in the first and the second embodiments, as shown in FIG. 10, the protruding portion 45 and the protruding portion 46 may be protruding portions which are formed on both end sides of a convex portion which is long in the Y-direction. In this case also the same effect as described above can be obtained.

The following aspects are derived from the above embodiments.

A robot according to a first aspect of the present invention includes an arm; a force sensor attached to a distal end portion of the arm; a tool or a support member for supporting the tool, which are attached to the force sensor; a plurality of protruding portions for detecting posture, which protrude from the tool or the support member; and a controller which determines a situation where all of the protruding portions are in contact with a work object on which the tool performs predetermined work based on detected values of the force sensor.

With the above described aspect, the controller determines a situation where all of the protruding portions have come in contact with the work object on the basis of the detected values of the force sensor. Whereas, the fact that all of the protruding portions come in contact with the work object means that the tool is in predetermined posture with regard to the work object. Accordingly, the above configuration is useful for accurately controlling the posture of the tool with regard to the work object.

Also, since the plurality of the protruding portions are used, it is possible to determine that the tool is in the predetermined posture with regard to the work object not only when the surface of the work object is a plane surface, but also when the surface thereof is a curved surface, a surface with unevenness, and the like.

With the above aspect, preferably, the controller determines a situation where all of the protruding portions are in contact with the work object by using a singularity which occurs in change in the detected values of the force sensor in a state where the posture of the tool or the support member is being changed.

Since this configuration uses the singularity which occurs in change in the detected values of the force sensor, the posture of the tool can accurately be adjusted by using a simple structure.

With the above aspect, preferably, the tool is a contact type measurement tool which performs a predetermined measurement in a state where the tool is in contact with the work object.

With this kind of the measurement tool, it is often the case that measurement values vary in response to posture of the tool with regard to the work object. Therefore, the above configuration, which is capable of accurately adjusting the posture of the tool, improves accuracy of the measurement which is performed by using the tool.

With the above aspect, preferably, the plurality of protruding portions protrude from the support member in a predetermined direction, wherein one end portion of the tool, which performs a predetermined work, protrudes from the support member in the predetermined direction, and the controller determines a situation where all of the protruding portions and the one end portion of the tool are in contact with the work object based on the detected values of the force sensor.

In the above aspect also, it is possible to detect that the protruding portions and the one end portion of the tool come in contact with the work object by using the singularity which occurs in the change in the detected values of the force sensor, which enables accurate adjustment of the posture of the tool with regard to the work object.

With the above aspect, preferably, three of the protruding portions protrude from the tool or the support member, and a central axis line of a wrist flange of the robot does not pass through a triangle formed by connecting distal ends of the three protruding portions.

By using the above configuration, it is more likely that a singularity, which occurs in a change of the torque, and which is detected by the force sensor, appears significantly.

According to the above aspects, it is possible to accurately control posture of a tool with regard to work objects without unnecessarily prolonging operation hours.

REFERENCE SIGNS LIST

1 robot
10 arm
11 servo motor
11*a* servo controller
12 wrist flange
20 control unit
21 controller
22 display
23 storage unit
23*a* system program
23*b* operation program
23*c* tool posture control program
23*d* measurement program
23*e* operation setting program
24 input device
25 transmitting and sending unit
30 force sensor
31 flange
40 support member
41 support member body
41*a* attachment portion
41*b* middle portion
41*c* distal end portion
41*d* through-hole
42 linear guide
43 tool holder
44 biasing member
45, 46, 47 protruding portions
45*a*, 46*a*, 47*a* distal end portions
50 tool
51 probe
CL central axis line
O work object

The invention claimed is:

1. A robot comprising:
an arm;
a force sensor attached to a distal end portion of the arm;
a support member attached to the force sensor and supporting a tool;
a plurality of protruding portions for detecting posture, which protrude from a distal end portion of the support member in a predetermined direction; and
a controller configured to control the arm,
wherein the tool is a tool for measurement, a tool for processing, or a tool for assembly,
the tool is supported by the support member so as to move in the predetermined direction,
the distal end portion has a through-hole formed therein, the through-hole penetrates the distal end portion in the predetermined direction and a part of the tool is inserted into the through-hole, and
the controller determines a situation where all of the protruding portions are in contact with a work object, on which the tool inserted into the through-hole performs predetermined work, based on detected values of the force sensor.

2. The robot according to claim 1, wherein the controller determines a situation where all of the protruding portions are in contact with the work object by using a singularity which occurs in change in the detected values of the force sensor in a state where the posture of the support member is being changed.

3. The robot according to claim 1, wherein the tool is a contact type measurement tool which performs a predetermined measurement in a state where the tool is in contact with the work object.

4. The robot according to claim 1, wherein the plurality of protruding portions protrude from the support member in a predetermined direction,
wherein one end portion of the tool, which performs the measurement, the processing, or the assembly, protrudes from the support member in the predetermined direction, and
the controller determines a situation where all of the protruding portions and the one end portion of the tool are in contact with the work object based on the detected values of the force sensor.

5. The robot according to claim 1, wherein three of the protruding portions protrude from the support member, and
a central axis line of a wrist flange of the robot does not pass through a triangle formed by connecting distal ends of the three protruding portions.

* * * * *